United States Patent
Dom et al.

(10) Patent No.: US 8,676,634 B2
(45) Date of Patent: Mar. 18, 2014

(54) STATISTICAL CREDIBILITY METRIC FOR ONLINE QUESTION ANSWERERS

(75) Inventors: Byron Dom, Los Gatos, CA (US); Deepa Paranjpe, Fremont, CA (US)

(73) Assignee: Yahoo! Inc., Sunnyvale, CA (US)

( * ) Notice: Subject to any disclaimer, the term of this patent is extended or adjusted under 35 U.S.C. 154(b) by 5 days.

(21) Appl. No.: 13/443,825

(22) Filed: Apr. 10, 2012

(65) Prior Publication Data
US 2012/0196265 A1 Aug. 2, 2012

Related U.S. Application Data

(62) Division of application No. 11/583,413, filed on Oct. 18, 2006, now Pat. No. 8,155,998.

(51) Int. Cl.
*G06Q 10/00* (2012.01)

(52) U.S. Cl.
USPC ............................................. 705/7.38

(58) Field of Classification Search
USPC ............................................. 705/7.38
See application file for complete search history.

(56) References Cited

U.S. PATENT DOCUMENTS

| | | |
|---|---|---|
| 6,275,811 B1 | 8/2001 | Ginn |
| 6,892,178 B1 | 5/2005 | Zacharia |
| 7,428,505 B1 | 9/2008 | Levy et al. |
| 7,552,081 B2 | 6/2009 | Dutta et al. |
| 2003/0216962 A1 | 11/2003 | Heller et al. |
| 2006/0286530 A1 | 12/2006 | Forrest et al. |
| 2007/0219958 A1 | 9/2007 | Park et al. |

OTHER PUBLICATIONS

The value of reputation on eBay: a controlled experiment. Experimental Economics, v9, n2, p. 79, Jun. 2006, Dialog File 9.

Yahoo! "Yahoo! Answers" located at http;//answers.yahoo.com/my/profile;_ylt=Ahvpc2Y7giwzAbRJVYe . . . retrieved on Jan. 15, 2007, copyright 2007, 1 page.

*Primary Examiner* — Andre Boyce

(74) *Attorney, Agent, or Firm* — Hickman Palermo Truong Becker Bingham Wong LLP; Daniel D. Ledesma

(57) ABSTRACT

Techniques for statistically estimating a rating or other "figure of merit" for a user are disclosed. According to one such technique, a first quantity of submissions that were submitted by a user is determined. A second quantity of submissions that (a) were submitted by the user and (b) obtained a particular rating from a rating mechanism also is determined. A user rating for the user is determined based at least in part on the first quantity, the second quantity, and a factor that is independent of both the first quantity and the second quantity—such as the probability that an answer submitted by any answerer in a population will obtain the particular rating from the rating mechanism. The influence that the second quantity has on the user rating relative to the influence that the factor has on the user rating may depend at least in part on the first quantity.

16 Claims, 2 Drawing Sheets

STATISTICAL CREDIBILITY METRIC FOR ONLINE QUESTION ANSWERERS

CROSS-REFERENCE TO RELATED APPLICATIONS; BENEFIT CLAIM

This application claims the benefit as a Divisional of U.S. patent application Ser. No. 11/583,413, filed Oct. 18, 2006 now U.S. Pat. No. 8,155,998 the entire contents of which is hereby incorporated by reference as if fully set forth herein, under 35 U.S.C. §120. The applicant(s) hereby rescind any disclaimer of claim scope in the parent application(s) or the prosecution history thereof and advise the USPTO that the claims in this application may be broader than any claim in the parent application.

FIELD OF THE INVENTION

The present invention relates to statistics and, more specifically, to a technique for determining, statistically, a credibility metric for online question answerers.

BACKGROUND

Yahoo! Answers is an example of an Internet-accessible answer submission system that allows users all over the world to submit questions that other users all over the world can view and answer. Users of answer submission systems submit such questions and answers using an Internet Browser such as Mozilla Firefox. After a user (an "asker") has submitted a question, other users can read the question and, if they choose, submit an answer to the question. Answer submission systems typically allow users to see, along with a question, answers that have been submitted for that question, and the pseudonyms of the users (the "answerers") who submitted those answers.

A particular question might receive multiple different answers from multiple different users. Some of the answers might be better than others. Answer submission systems may provide a mechanism for users to judge the value of an answer. For example, Yahoo! Answers provides a mechanism whereby the asker can select the best answer submitted for the asker's question. The selected best answer is designated as such. Other users can see which of the answers was selected as the best answer.

Over time, some answerers might tend to submit better answers to questions than other answerers do. This may be the result of the expertise of some answerers in comparison to the relative inexperience of other answerers on a particular topic, for example. Answerers who submit better answers might tend to have a greater proportion of their answers selected by askers as best answers. Consequently, the number of an answerer's answers that have been selected by askers as best answers can be used as an indicator of the expertise, wisdom, trustworthiness, and/or reliability of that answerer. At least one answer submission system provides a mechanism whereby everyone can see the number of best answers that have been submitted by each answerer. Askers might give more weight to answers provided by a particular answerer if a high percentage of the particular answerer's answers have been selected as best answers.

For each question, though, there can only be one best answer selected from among potentially many answers submitted for that question. Consequently, the vast majority of answers submitted for each question will not be selected as best answers. Unless they are extraordinary, most answerers do not have a very good chance of having many of their answers selected as best answers. However, with each answer that a particular answerer submits, the chances that at least one of the particular answerer's answers will be selected as a best answer improve at least marginally. As a result, answerers who have submitted a large quantity of answers tend to have more reliable "best-answer indicators" than answerers who have submitted fewer answers.

The traditional best-answer indicator, which is sometimes defined as the proportion of an answerer's answers that have been selected as best answers, sometimes fails to reflect accurately the true merit and credibility of that answerer. An answerer who has submitted only one answer probably will not have his answer selected as a best answer, with the result that his best-answer indicator will have a value of zero. As a result, many new answerers will end up with best-answer indicators that seem to indicate that those answerers' answers are not highly credible—even though, in reality, those answerers might be very credible. Those new answerers might go on to have a greater-than-average proportion of their answers selected as best answers over time. Unfortunately, when an answerer has submitted answers to only a few questions, the number of that answerer's answers that have been selected as best answers is often not a very accurate reflection of that answerer's merit or credibility. Alternatively, in the unusual instance in which an answerer has only submitted a single answer and that answer has been chosen as a best answer, the value of that answerer's best-answer indicator will be one, indicating that his answers are always selected as best answers—which is virtually impossible.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
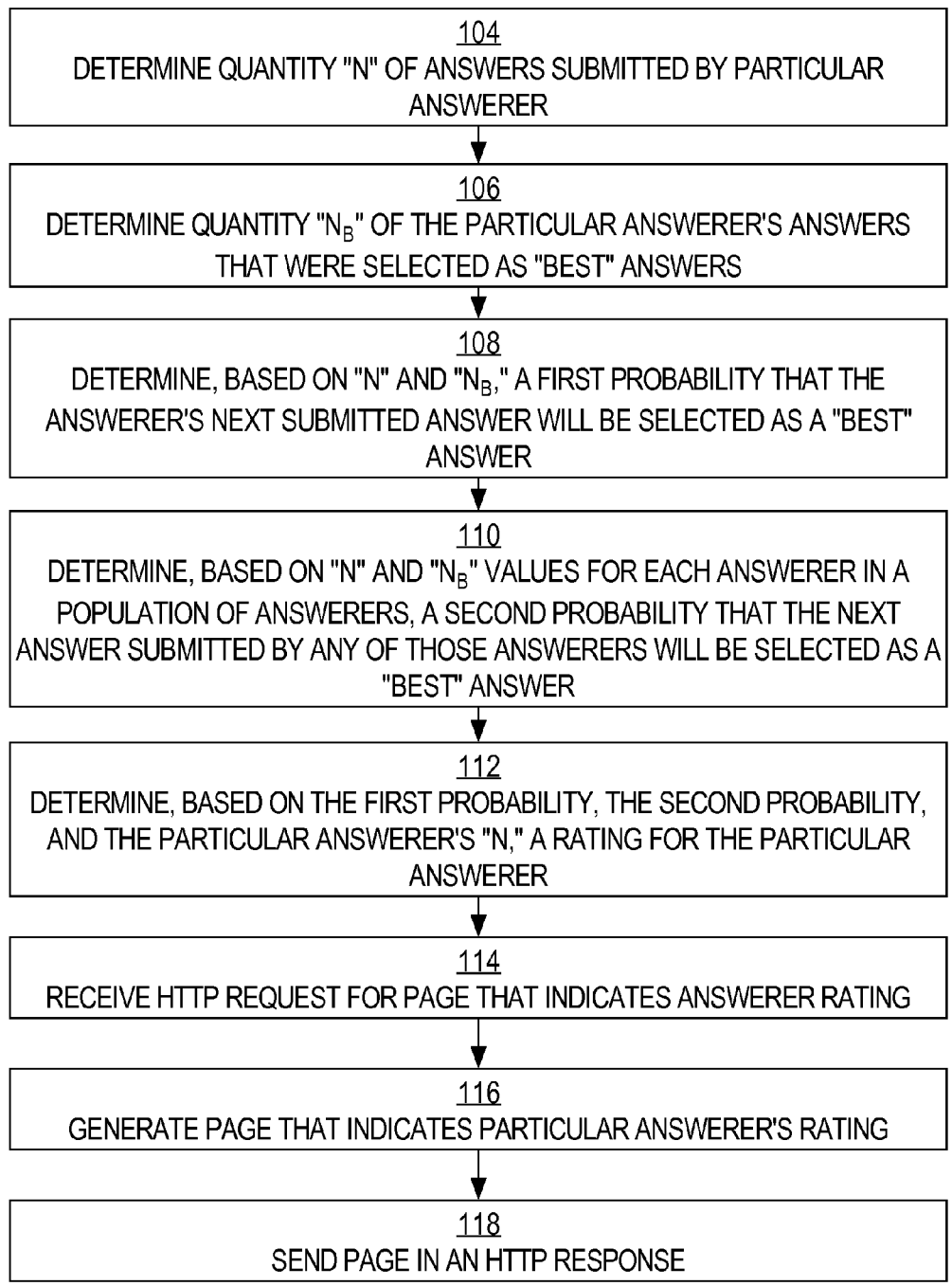
FIG. 1 is a flow diagram that illustrates an example of a technique for estimating a credibility rating for an answerer, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

According to one embodiment of the invention, a credibility rating or "figure of merit" for an answerer is determined using a statistical technique that does not unfairly penalize or unfairly reward the answerer due to sampling error associated with having answered only a few questions.

According to this technique, the answerer's "true" credibility rating is approximated by statistically estimating the probability that the answerer's future answer will be selected as the best answer to a question. Although the answerer's "true" credibility rating—the actual probability that the answerer's future answer will be selected as a best answer—cannot be known with certainty in most cases, the answerer's "true" credibility rating can be estimated statistically. In order to avoid unfairly penalizing or unfairly rewarding an answerer who has answered only a few questions, the answerers' estimated credibility rating is determined based at least in part not only on the answerer's own actual previous performance, but also on the "composite" previous performance of a population of other answerers of which the answerer is a part.

At first, when the answerer has answered only a few questions, the proportion of the answerer's answers that have been selected as best answers usually will be a poor indicator, on its own, of the answer's "true" credibility rating; given a very small sample of the answerer's answers, the proportion of those answers that have been selected as best answers is, statistically, not very determinative of the probability that a future answer of that specific answerer will be selected as a best answer. Therefore, in one embodiment of the invention, the extent to which the answerer's previous performance influences the answerer's credibility rating is based on the number of answers that the answerer has submitted. If the answerer has submitted relatively few answers, then the answerer's previous performance (i.e., the proportion of the answerer's answers that have been selected as best answers) influences the answerer's credibility rating to only a relatively minor extent. Alternatively, if the answerer has submitted relatively many answers, then the answerer's previous performance influences the answerer's credibility rating to a relatively major extent. As the number of answers submitted by the answerer becomes sufficiently large, the influence that the answerer's previous performance has on the answerer's credibility rating approaches complete and exclusive influence.

Later, when the answerer has answered very many questions, the proportion of the answerer's answers that have been selected as best answers is an excellent indicator, on its own, of the answer's "true" credibility rating; given a very large sample of the answerer's answers, the proportion of those answers that have been selected as best answers is, statistically, very determinative of the probability that a future answer of that specific answerer will be selected as a best answer.

In one embodiment of the invention, the answerer's credibility rating is influenced, to varying extents, by the previous performance of a population of other answerers of which the answerer is a member. Given such a population of answerers, a "composite" previous performance of those answerers as a group may be determined statistically. When very little or nothing can be ascertained about an answerer's "true" credibility due to the lack of actual previous performance data available for the answerer, it is reasonable to assume that the answerer's predicted future performance will be at least somewhat similar to the predicted future performance of a theoretical answerer who represents the statistical composite of all answerers in the population of which the answerer is a member. Therefore, in one embodiment of the invention, as the number of answers submitted by an answerer approaches zero, the influence that the population's previous performance has on the answerer's credibility rating approaches complete and exclusive influence. Conversely, as the number of answers submitted by an answerer approaches infinity, the influence that the population's previous performance has on the answerer's credibility rating wanes to no influence whatsoever. As the amount of actual previous performance data for the answerer grows, the answerer's actual previous performance data supplants, more and more, the population's previous performance data in estimating the answerer's credibility rating.

Techniques for statistically estimating an answerer's credibility rating or "figure of merit" are described in greater detail below.

Estimating an Answerer's Credibility Rating

According to one embodiment of the invention, an answerer's credibility rating is characterized by the probability that the answerer's answer will be selected as a best answer for a question in a category or set of questions being considered. This probability is represented by $\theta$. Because $\theta$ is considered to be a hidden variable, $\theta$ can only be estimated statistically from specific observations associated with the answerer. Such observations include the number of the answerer's answers that have been selected as best answers, $n_B$, and the number of answers that the answerer has submitted, n.

Embodiments of the invention address the potentially high degree of uncertainty that is associated with estimating a credibility rating when the estimated credibility rating is based on a small number of the answerer's own answers.

According to one embodiment of the invention, an answerer's credibility rating is estimated based on a "Bayesian smoothing" technique, which is described below. In one embodiment of the invention, the credibility rating is estimated based on a mixture of overall population statistics and statistics of the specific answerer. The greater the number of answers that the answerer has submitted, the greater will be the contribution of the answerer's specific statistics to the answerer's credibility rating relative to the contribution of the statistics of the overall population.

According to one embodiment of the invention, at the extremes, for n=0, the only statistics available for the answerer are those of the overall population. Therefore, when n=0, the statistics of the overall population will dominate the estimation of the answerer's credibility rating for small n. For large n (n→∞), however, the estimation of the answerer's credibility rating will be completely dominated by the specific answerer's statistics, making the overall population statistics irrelevant.

Discussed below are details of an example of one technique for estimating a specific answerer's credibility rating based on both his own prior performance and the prior performances of a population of users. In one embodiment of the invention, a two-dimensional contingency table $h(n, n_B)$ contains the counts (numbers) of answerers who have, to date, answered n questions and had $n_B$ of those answers rated as best answers by the question askers. An observed distribution, as captured by $h(n, n_B)$, is combined with the particular n and $n_B$ values for a single specific answerer in order to obtain a "safe" (in the sense of neither over penalizing nor over rewarding the single answerer due to sampling error inherent in his particular observed n and $n_B$ values) estimates (computed ratings). There are many different ways in which such a combination might be made in order to obtain such estimates.

For example, the following estimate might be used:

$$\theta^* = [1-\beta(n)]\left(\frac{n_B}{n}\right) + \beta(n)\bar{\theta},$$

Where $\bar{\theta}$ is the probability of any answer given by any answerer in a specified population being selected as a best answer. The function $\beta(n)$ may be some simple monotonically decreasing function of n such as $e^{-\lambda n}$, where $\lambda$ is a positive adjustable parameter.

As an estimate of this, the total number of best answers divided by the total number of answers may be used. This may be written (and computed) as:

$$\bar{\theta} = \frac{\sum_{n=0}^{n_{MAX}} \sum_{n_B=0}^{n} n_B h(n_B, n)}{\sum_{n=0}^{n_{MAX}} n \sum_{n_B=0}^{n} h(n_B, n)}.$$

As another potential definition for $\bar{\theta}$, the average value of the ratio $$\left(\frac{n_B}{n}\right)$$

over the population of answerers might be computed. That is:

$$\bar{\theta} = \frac{\sum_{n=0}^{n_{MAX}} \sum_{n_B=0}^{n} \left(\frac{n_B}{n}\right)(n_B, n)}{\sum_{n=0}^{n_{MAX}} \sum_{n_B=0}^{n} h(n_B, n)}.$$

Another approach follows the Bayesian paradigm for statistical estimation, a key feature of which is the prior distribution $\pi(\theta)$, which is estimated from $h(n, n_B)$. One estimate of this is:

$$\pi(\theta) = \frac{\sum_{\{n, n_B | (n_B/n)=\theta\}} h(n, n_B)}{\sum_{n=0}^{n_{MAX}} \sum_{n_B=0}^{n} h(n, n_B)},$$

where the sum in the numerator is over all pairs $(n, n_B)$ for which $$\left(\frac{n_B}{n}\right) = \theta.$$

Unfortunately, this is a discrete distribution that only has non-zero values for a finite enumerable set of $\theta$ values. One way to address this is to fit the distribution $h(n, n_B)$ to a smooth/continuous probability distribution. This distribution may be a specific parametric functional form like the Beta distribution or, if the distribution is not well-described by a single Beta distribution, a mixture (weighted sum) of Beta distributions can be used. Beta distributions (including mixtures of Betas) are appealing because they are conjugate in Bayesian terminology. An implication of this is that integrals of the products of binomial distributions and Beta distributions, such as those used in certain embodiments of the invention, evaluate to closed forms, which are computationally convenient. There are a large number of mathematical fitting and smoothing techniques that may be applied to obtain a smooth prior distribution $\pi(\theta)$ from the observations tabulated in $\{h(n, n_B)\}$.

Alternative Contexts and General Applicability

Although techniques described herein are described in the context of determining a credibility rating for an answerer, techniques described herein also may be applied to other contexts. When applied to other contexts, some aspects of the techniques described herein may differ. For example, the fundamental quantity that is being used as a measure may change. In some embodiments of the invention described herein, this fundamental quantity is the probability $\theta$, but some other fundamental quantity might be selected when techniques described herein are generalized or adapted to other contexts.

For another example, the functional form of the probability distribution that relates directly observable quantities (e.g., $n_B$ given n) to the fundamental quantity (e.g., $(\theta)$) might differ. In one embodiment of the invention, the probability distribution is a binomial distribution that is described in further detail below, and the functional form is a direct theoretical consequence of assuming that that answerer's performance is describable by the parameter $\theta$, which is the probability that an answerer's answer will be selected as a best answer. However, when techniques described herein are applied to other problems, there may be some latitude in choosing the probability distribution (the functional form of the distribution) to be used.

For another example, the functional form of the prior distribution (e.g., $\pi(\theta)$) of the fundamental quantity might differ. Although in one embodiment of the invention the functional form of the prior distribution is a mixture of Beta distributions described in further detail below, in other embodiments of the invention, the functional form of the prior distribution might take a different form.

The Posterior Distribution

According to one embodiment of the invention, an answerer's credibility rating is estimated based on the following idealization. An answerer is assumed to have an associated attribute $\theta$, which is the probability that an answer given by the answerer will be chosen by the question asker as a best answer. In one embodiment of the invention, $\theta$ is assumed to be independent of other factors such as the category of the question and the identity of the asker. In such a scenario, if the answerer answers n questions, the probability that $n_B$ of those answers will be chosen as best answers is given by the binomial distribution:

$$p(n_B|n,\theta) = \binom{n}{n_B}\theta^{n_B}(1-\theta)^{n-n_B} \quad (1)$$

The answerer's credibility rating or "figure of merit" may be any one of a number of possible estimates of $\theta$ or measures that are statistically associated with $\theta$. According to one embodiment of the invention, in order to obtain fairer estimates of the answerer's credibility rating, a Bayesian statistical paradigm is adopted. In this paradigm, a prior distribution $\pi(\theta)$ is assumed. Based on the prior distribution $\pi(\theta)$, a posterior distribution $p(\theta|n_B, n)$ may be formed, where:

$$p(\theta | n_B; n) = \frac{p(n_B | \theta; n)\pi(\theta)}{p(n_B; n)} \quad (2)$$

One way of constructing the prior distribution $\pi(\theta)$ in the foregoing equation is by using the $(n, n_B)$ data for all answerers in a population of answerers (e.g., all Yahoo! Answers users). Many different techniques might be used to construct the prior distribution $\pi(\theta)$. An example technique for constructing the prior distribution $\pi(\theta)$ is described in greater detail below.

Constructing the Prior Distribution

In one embodiment of the invention, a prior distribution $\pi(\theta)$ is constructed based on data collected for multiple answerers in a population of answerers (e.g., the n and $n_B$ values for each answerer in the population). In order to obtain a closed form for the prior distribution $\pi(\theta)$, the Beta distribution may be used as the prior distribution. Alternatively, a mixture of Beta distributions might be fitted together to form a prior distribution. The Beta distribution is conjugate to the Binomial distribution, and therefore gives a closed form when integrated with the Binomial distribution.

The Beta distribution, generally, is given by the following equation:

$$f(x; \alpha, \beta) = \frac{x^{\alpha-1}(1-x)^{\beta-1}}{\int_0^1 u^{\alpha-1}(1-u)^{\beta-1} du}$$

$$= \frac{\Gamma(\alpha+\beta)}{\Gamma(\alpha)\Gamma(\beta)} x^{\alpha-1}(1-x)^{\beta-1}$$

$$= \frac{1}{B(\alpha, \beta)} x^{\alpha-1}(1-x)^{\beta-1}$$

where $\alpha$ and $\beta$ are parameters that must be greater than zero, $\Gamma(\ )$ is the Gamma function, and $B(\ )$ is the Beta function.

Using a single Beta distribution, the prior distribution $\pi(\theta)$ is then:

$$\pi(\theta; \alpha, \beta) = \frac{1}{B(\alpha, \beta)} \theta^{\alpha-1}(1-\theta)^{\beta-1} \quad (3)$$

and if a mixture of Beta distributions is used, then the prior distribution $\pi(\theta)$ is of the form:

$$\pi(\theta; \alpha, \beta, \eta) = \sum_{i=1}^{m} \frac{\eta_i}{B(\alpha_i, \beta_i)} \theta^{\alpha_i-1}(1-\theta)^{\beta_i-1}, \quad (4)$$

Where $\alpha$, $\beta$, and $\eta$ are m-component vectors and $\eta$ is normalized such that $$\sum_{i=1}^{m} \eta_i = 1.$$

Statistical Values Usable to Determine a Credibility Rating

Several different statistical values that are either derived from or statistically associated with $\theta$ may be used as, or to at least partially determine, an answerer's credibility rating or "figure of merit." One such value that may be used is the "maximum a posteriori" (MAP) estimate $\hat{\theta}_{MAP}$ of $\theta$, which is given by the following equation:

$$\hat{\theta}_{MAP} = \arg\max p(\theta|n_B; n) \quad (5)$$

The above formula is for a probability density, which can be integrated over a finite interval to obtain a finite (non-infinitesimal) probability. For example:

$$\gamma = p(\theta > \theta_\gamma | n_B, n) \equiv \int_{\theta_\gamma}^{1} p(\theta | n_B, n) d\theta, \quad (6)$$

where $p(\theta>\theta_\gamma|n_B,n)$ is the conditional probability that $\theta>\theta_\gamma$ given the observed values $n_B$ and n. Another value that may be used as, or to at least partially determine, an answerer's credibility rating or "figure of merit" is $\theta_\gamma$.

The two rating measures $\hat{\theta}_{MAP}$ and $\theta_\gamma$ are essentially types of statistical estimates of $\theta$. These estimates are formulated within the Bayesian statistical paradigm. One of these estimates, $\theta_\gamma$, is an interval estimate in which the upper limit of the interval is $\theta=1$. That is, $\theta$ is understood to lie within the interval $[\theta_\gamma, 1]$ with probability $\gamma$. This is an instance of the Bayesian concept of a credible interval (CI), which is the counterpart of a confidence interval in classical statistics. This type of credible interval is referred to as being "one-sided" because one of the limits of the interval (the upper one in this case) is the end of the range of possible values for the parameter ($\max(\theta)=1$).

With this understanding, the following relationships may be applied:

$$p(\theta | n_B; n) = \frac{p(n_B | \theta; n)\pi(\theta)}{p(n_B; n)}$$

$$p(n_B | \theta; n) = \binom{n}{n_B} \theta^{n_B}(1-\theta)^{n-n_B}$$

$$p(n_B; n) = \int_0^1 p(n_B | \theta; n)\pi(\theta) d\theta$$

$$P(\theta > \theta_\gamma | n_B, n) = \frac{\int_{\theta_\gamma}^{1} p(n_B | \theta; n)\pi(\theta) d\theta}{\int_0^1 p(n_B | \theta; n)\pi(\theta) d\theta}$$

Another value that may be used as, or to at least partially determine, an answerer's credibility rating or "figure of merit" is the posterior expectation $\hat{\theta}$ of $\theta$, which is given by the following equation:

$$\hat{\theta} \equiv E_\pi(\theta | n_B, n) \equiv \int_0^1 \theta p(\theta | n_B, n) d\theta \quad (7)$$

The fact that the parameter $\theta$ is interpreted as a probability means that $\hat{\theta}$ is the probability that the next answer that the answerer gives will be selected as a best answer, given the answerer's historical performance data (i.e., $(n, n_B)$) and assuming the prior distribution $\pi(\theta)$.

Although the parameter $\theta$ is used in the above equations, which can be used to determine credibility ratings for an answerer, in an alternative embodiment of the invention, similar statistics of a numerical score s given to the best answer by the asker may be used instead of using $\theta$.

Example Flow

FIG. 1 is a flow diagram that illustrates an example of a technique for estimating a credibility rating for an answerer, according to an embodiment of the invention. The technique described is merely one embodiment of the invention. The technique, or portions thereof, may be performed, for example, by one or more processes executing on a computer system such as that described below with reference to FIG. 2. For example, the technique may be performed by one or more processes executing on an Internet-accessible server.

According to one embodiment of the invention, a credibility rating for a particular answerer is re-determined or recomputed whenever the particular answerer answers another question and/or whenever one of the particular answerer's answers is selected as a best answer. Such actions typically will modify the n and/or $n_B$ values maintained for the particular user. The particular answerer's credibility rating may be updated within a database.

In block 104, a quantity n of answers that were submitted by a particular answerer (of potentially many answerers who submitted answers to a question) is determined. In one embodiment of the invention, the quantity n is the total number of answers that the particular answerer has submitted to one or more questions. The server may maintain statistics that indicate, for each answerer, the total number of answers that the answerer has submitted.

In block 106, a quantity $n_B$ of answers that were both (a) submitted by the particular answerer and (b) selected or designated as a "best" or "selected" answer by askers (or other people besides the particular answerer) is determined. For example, if the particular answerer submitted 10 answers to 10 different questions, and if 2 of those answers were selected as "best" answers by the askers of those questions, then the server may determine that the particular answerer's n is 10, and that the particular answerer's $n_B$ is 2. The server may maintain statistics that indicate, for each answerer, the total number of the answerer's answers that have been selected as "best" answers.

Although in one embodiment of the invention the quantity $n_B$ indicates the quantity of the particular answerer's "best answers," in alternative embodiments of the invention, the quantity $n_B$ may indicate a quantity of the particular answerer's submissions (whether answers or other types of submissions) that have obtained at least a specified rating (whether the rating is a "best answer" rating, a numerical rating, or some other type of rating) from some specified rating mechanism (whether the mechanism comprises rating by question submitters or some other kind of rating mechanism).

In block 108, based at least in part on the quantity n and the quantity $n_B$, a first probability that a future answer submitted by the particular answerer will be designated or selected as a "best" or "selected" answer by question askers (or other people besides the particular answerer) is determined.

In block 110, a second probability is determined. The second probability is the probability that an answer, submitted by any answerer in a specified population of multiple answerers that includes the particular answerer, will be designated or selected as a "best" or "selected" answer by question askers (or other people besides those who submitted the answer). For example, the second probability may be determined using the Bayesian statistical techniques described above. The second probability may be determined based on a prior distribution $\pi(\theta)$ that has been constructed using the collected n and $n_B$ values for all of the answerers in the specified population, for example.

Although in one embodiment of the invention the second probability is the probability that an answer, submitted by any answerer in a specified population of multiple answerers that includes the particular answerer, will be designated or selected as a "best" or "selected" answer, in alternative embodiments of the invention, a factor other than the second probability may be used instead of the second probability wherever the second probability would be used. However, like the second probability, this other factor may be independent of both the particular answerer's n and $n_B$.

In block 112, a credibility rating for the particular answerer is determined based at least in part on the first probability, the second probability, and the quantity n determined for the particular answerer. For example, the credibility rating may be determined based at least partially on the statistical estimates $\hat{\theta}_{MAP}$, $\theta_\gamma$, and/or $\hat{\theta}$ as described above. More specifically, in one embodiment of the invention, the influence that the first probability has on the credibility rating, relative to the influence that the second probability has on the credibility rating, is based on the quantity n determined for the particular answerer. For example, if n is large, then the first probability may have a major influence on the answerer's credibility rating while the second probability may have a minor influence on the answerer's credibility rating. In contrast, if n is small, then the first probability may have a minor influence on the answerer's credibility rating while the second probability may have a major influence on the answerer's credibility rating. In one embodiment of the invention, as n increases, the influence that the first probability has on the answerer's credibility rating increases while the influence that the second probability has on the answerer's credibility rating decreases. The computation of the statistical estimates $\hat{\theta}_{MAP}$, $\theta_\gamma$, and $\hat{\theta}$ described above incorporates the varying influences of the particular answerer's own n and $n_B$ values and the collected n and $n_B$ values for all of the answerers in the specified population.

In one embodiment of the invention, the credibility rating is normalized so that the credibility rating represents a corresponding value within a specified range of values (e.g., 1 to 10, 0 to 100, etc.). As is discussed above, the answerer's credibility rating may be stored in a database in association with other information about the answerer.

In block 114, a Hypertext Transfer Protocol (HTTP) request is received over a network. For example, a server may receive such a request over the Internet. Such a request might originate from an Internet browser, such as Mozilla Firefox, executing on a computer that is located remotely from the server. Such a request might be a request for a dynamically generated web page that indicates answers to a question, pseudonyms of answerers who submitted those answers, and credibility ratings of those answerers, for example.

In block 116, the requested web page is dynamically generated. For example, the server may generate the web page dynamically. In one embodiment of the invention, when generated, the requested web page indicates the particular answerer's answer to a particular question, the particular answerer's pseudonym, and the particular answerer's credibility rating (potentially along with the answers, pseudonyms, and credibility ratings of other answerers who also submitted answers to the particular question).

In block 118, a HTTP response is sent over a network toward the origin of the HTTP request discussed with reference to block 114. For example, the server may send the HTTP response over the Internet. The HTTP response includes data that represents the web page. When an Internet browser that executes at the origin of the HTTP request receives the HTTP response, the Internet browser responsively displays the web page, including the particular answerer's credibility rating. Thus, by sending the HTTP response, the server essentially causes the particular answerer's credibility to be displayed.

In one embodiment of the invention, a "composite" answerer rating is determined for the specified population of multiple answerers discussed above. The composite answerer rating is estimated based on the collected n and $n_B$ values for all of the answerers in the specified population. The composite answerer rating reflects the probability that an answer submitted by any answerer in the specified population will be designated or selected as a "best" or "selected" answer by question askers (or other people besides those who submitted the answer). In such an embodiment of the invention, the particular answerer's rating may be determined based at least in part on this composite answerer rating and the particular answerer's own n and $n_B$ values. The influence that the composite answerer rating has on the particular answerer's rating decreases as the particular answerer's own n value increases. In contrast, the influence that the particular answerer's own $n_B$ value has on the particular answerer's rating increases as the particular answerer's own n value increases.

Hardware Overview

Figure 2:
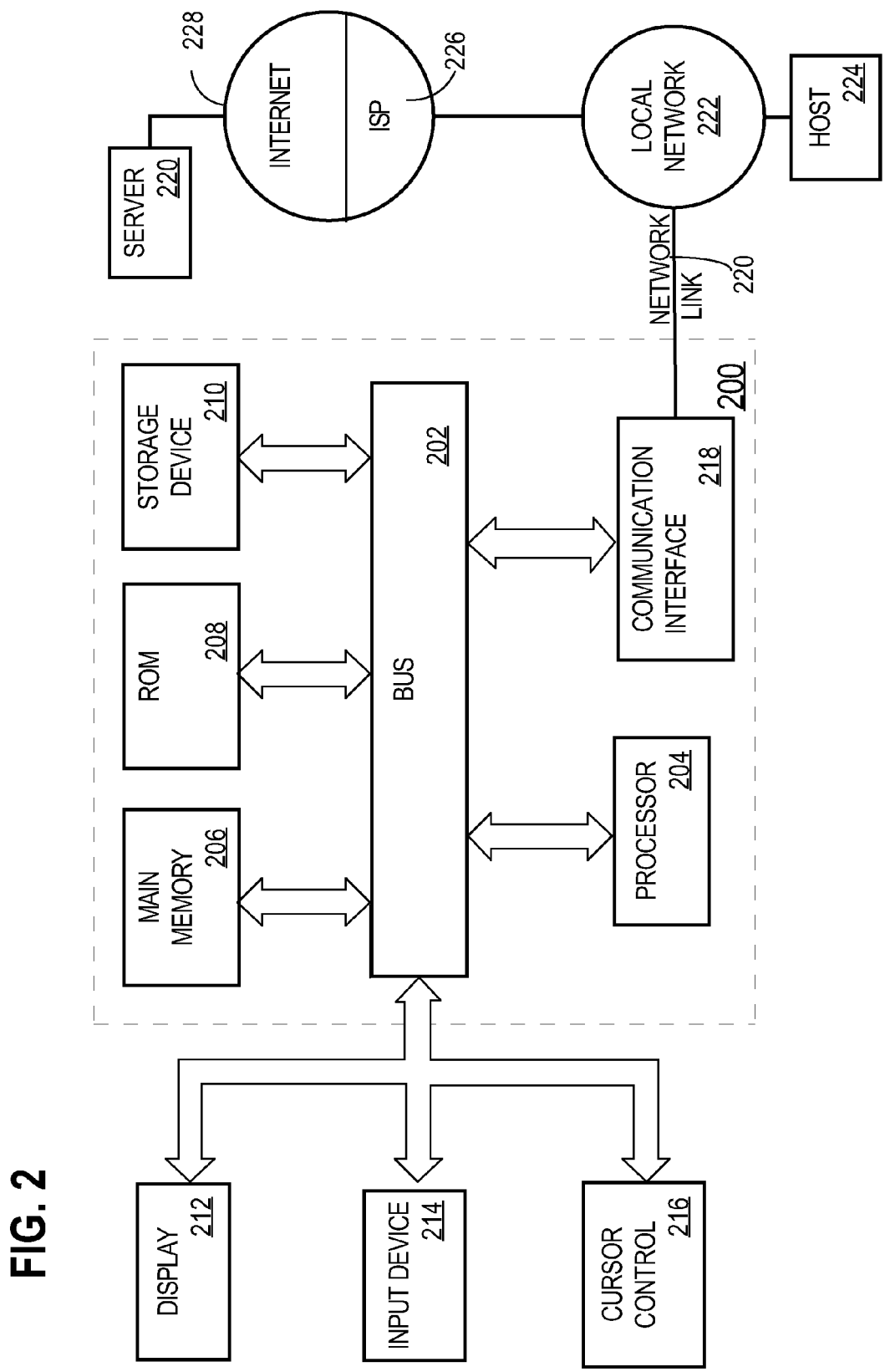
FIG. 2 is a block diagram of a computer system on which embodiments of the invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operate in a specific fashion. In an embodiment implemented using computer system 200, various machine-readable media are involved, for example, in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of rating a particular user, the method comprising:
   determining a first quantity of answers that were submitted by the particular user;
   determining a second quantity of answers that were (a) submitted by the particular user and (b) designated as selected answers by one or more users other than the particular user;
   determining, based at least in part on the first quantity and the second quantity, a first probability that an answer submitted by the particular user will be designated as a selected answer by one or more users other than the particular user;
   determining a second probability that a particular answer submitted by any user in a specified group of two or more users will be designated as a selected answer by one or more users other than a user that submitted the particular answer;
   determining a rating for the particular user based at least in part on the first probability, the second probability, and the first quantity; and
   displaying the rating as a measure of credibility of answers submitted by the particular user;
   wherein, in determining the rating, an influence that the first probability has on the rating relative to an influence that the second probability has on the rating is based at least in part on the first quantity;
   wherein the method is performed by one or more computing devices.

2. The method of claim 1, wherein, in determining the rating, as the first quantity increases, the influence that the first probability has on the rating increases and the influence that the second probability has on the rating decreases.

3. The method of claim 1, wherein the second quantity of answers were designated as the best answer among a plurality of answers.

4. The method of claim 1, wherein the second quantity of answers were to one or more questions that are limited to a particular category.

5. The method of claim 1, wherein displaying the rating comprises displaying, based on the rating, a credibility rating in association with (a) user data that indicates the particular user and (b) answer data that indicates a particular answer provided by the particular user to a particular question.

6. The method of claim 5, wherein displaying the credibility rating comprises concurrently displaying a plurality of credibility ratings, each in association with (c) a different user of a plurality of users that includes the particular user and (d) a different answer of a plurality of answers that includes the particular answer.

7. The method of claim 1, wherein displaying the rating is performed in response to receiving an HTTP request over a network.

8. The method of claim 7, wherein the HTTP request is for a webpage that indicates a set of answers to a question, pseudonyms of answerers who submitted the set of answers, or credibility ratings of the answerers.

9. One or more non-transitory machine-readable media storing instructions, which, when executed by one or more processors, cause:
   determining a first quantity of answers that were submitted by a particular user;
   determining a second quantity of answers that were (a) submitted by the particular user and (b) designated as selected answers by one or more users other than the particular user;
   determining, based at least in part on the first quantity and the second quantity, a first probability that an answer submitted by the particular user will be designated as a selected answer by one or more users other than the particular user;
   determining a second probability that a particular answer submitted by any user in a specified group of two or more users will be designated as a selected answer by one or more users other than a user that submitted the particular answer;
   determining a rating for the particular user based at least in part on the first probability, the second probability, and the first quantity; and
   displaying the rating as a measure of credibility of answers submitted by the particular user;
   wherein, in determining the rating, an influence that the first probability has on the rating relative to an influence that the second probability has on the rating is based at least in part on the first quantity.

10. The one or more non-transitory machine-readable media of claim 9, wherein, in determining the rating, as the first quantity increases, the influence that the first probability has on the rating increases and the influence that the second probability has on the rating decreases.

11. The one or more non-transitory machine-readable media of claim 9, wherein the second quantity of answers were designated as the best answer among a plurality of answers.

12. The one or more non-transitory machine-readable media of claim 9, wherein the second quantity of answers were to one or more questions that are limited to a particular category.

13. The one or more non-transitory machine-readable media of claim 9, wherein displaying the rating comprises displaying, based on the rating, a credibility rating in association with (a) user data that indicates the particular user and (b) answer data that indicates a particular answer provided by the particular user to a particular question.

14. The one or more non-transitory machine-readable media of claim 13, wherein displaying the credibility rating comprises concurrently displaying a plurality of credibility ratings, each in association with (c) a different user of a plurality of users that includes the particular user and (d) a different answer of a plurality of answers that includes the particular answer.

15. The one or more non-transitory machine-readable media of claim 9, wherein displaying the rating is performed in response to receiving an HTTP request over a network.

16. The one or more non-transitory machine-readable media of claim 15, wherein the HTTP request is for a webpage that indicates a set of answers to a question, pseudonyms of answerers who submitted the set of answers, or credibility ratings of the answerers.

\* \* \* \* \*